United States Patent Office.

SILAS R. DIVINE, OF LOCH SHELDRAKE, ASSIGNOR TO REND ROCK POWDER COMPANY, OF NEW YORK, N. Y.

BLASTING AND BLASTING-CARTRIDGE.

SPECIFICATION forming part of Letters Patent No. 243,433, dated June 28, 1881.

Application filed December 7, 1880. (No model.)

*To all whom it may concern:*

Be it known that I, SILAS R. DIVINE, of Loch Sheldrake, Sullivan county, New York, have invented certain Improvements in Blasting-Cartridges, of which the following is a specification.

It is the object of my invention to facilitate the use of high explosives in blasting operations. To this end I have invented a blasting compound composed of two inexplosive ingredients, the one a solid and the other a liquid, the solid being capable of absorbing the liquid, and the result of such absorption being the conversion of the two ingredients of the compound into a high explosive.

My present invention, which involves the employment of a compound of this character, consists in constructing cartridge shells or envelopes, preferably of muslin, cloth, paper, or other porous material, and of the shapes and sizes of ordinary blasting-cartridges, and in filling such shells with the solid ingredient of my explosive, and in providing the liquid ingredient in a separate vessel suitable for transportation, so that, finally, when the cartridge is required for use, the consumer effects the necessary combination of the ingredients by causing the solid ingredient to absorb the liquid ingredient, either by immersing the cartridge-shell in the liquid ingredient or by opening one end of the cartridge and slowly pouring the liquid ingredient upon the solid ingredient contained in the cartridge-shell.

It will thus be seen that my cartridge-shell is prepared for transportation by being charged with a solid ingredient, which, by reason of its not being explosive, can be safely handled and transported, the completion of the charge being effected by the consumer at the time when the cartridge is required for use, such completion consisting merely in the addition of the required quantity of the liquid ingredient to the solid ingredient.

The compound which I intend to use for this purpose I have made the subject of a separate application for a patent, and it does not, therefore, except in connection with my blasting-cartridge, form a part of my present invention. It is preferably composed of crushed or powdered chlorate of potash or its eqivalents, the perchlorate or permanganate of potash as the solid ingredient, and nitro-benzole as the liquid ingredient, the proportions being, say, from three to four parts of chlorate of potash to one part of nitro-benzole. Although these proportions may be varied without materially affecting the efficiency of the explosive, it may be desirable in some cases that exact proportions should be adhered to, and I therefore intend, in practice, to provide for use, when desired, separate packages or bottles, each containing the quantity of nitro-benzole required for the amount of chlorate of potash contained in a single cartridge.

By means of my porous cartridge-envelope the relative proportions of the ingredients of my compound may be conveniently fixed with suitable accuracy by first allowing the solid ingredient to become fully saturated with the liquid ingredient and then squeezing or wringing out the cartridge by hand.

As soon as the ingredients of my explosive are mechanically united by the absorption of the liquid ingredient by the solid ingredient in the desired proportions the cartridge is ready for use, and may, if desired, be at once inserted in the drill-hole and exploded by percussion.

As nitro-benzole is not miscible with water, my solid ingredient and my porous cartridge-envelope, by the absorption of nitro-benzole, become water-repellent, and my cartridge is thus especially adapted for blasting in water.

I claim as my invention—

1. The improvement in the art of blasting herein described, which consists in preparing an explosive compound from an inexplosive solid ingredient, such as crushed or powdered chlorate of potash, and an inexplosive liquid ingredient, such as nitro-benzole, by depositing prescribed quantities of the solid ingredient in cylindrical cartridges or envelopes made of cloth, paper, or other porous material, of diameters corresponding to the diameters of the drill-holes in which the explosive is to be employed, and in immersing the envelopes containing the solid ingredient in the liquid ingredient or otherwise saturating the solid ingredient and its envelope with the liquid ingredient, preparatory to depositing the cylindrical envelope or cartridge in the drill-hole and igniting it with an exploder or by any other of the usual means.

2. The improved blasting-cartridge herein described, which consists of a cylindrical cartridge or envelope made of cloth, paper, or other porous material containing a solid substance, such as crushed or powdered chlorate of potash or its equivalent, which, together with its envelope, is saturated with a liquid, such as nitro-benzole or its equivalent, substantially in the manner and for the purposes set forth.

SILAS R. DIVINE.

Witnesses:
WM. SCOTT DE CAMP,
G. R. KIMBALL.

---

It is hereby certified that in Letters Patent No. 243,433, issued June 28, 1881, upon the application of Silas R. Divine, for an improvement in "Blasting and Blasting-Cartridges," the assignee, "the Rend Rock Powder Company," was erroneously described as of New York, New York;" whereas it should read "a corporation created by authority of the laws of the State of New Jersey;" that the proper corrections have been made in the files and records pertaining to the case in the Patent Office, and are hereby made in said Letters Patent.

Signed, countersigned, and sealed this 15th day of November, A. D. 1881.

[SEAL.]

A. BELL,
*Acting Secretary of the Interior.*

Countersigned:
E. M. MARBLE,
*Commissioner of Patents.*